United States Patent [19]

Grady et al.

[11] Patent Number: 5,528,281

[45] Date of Patent: Jun. 18, 1996

[54] METHOD AND SYSTEM FOR ACCESSING MULTIMEDIA DATA OVER PUBLIC SWITCHED TELEPHONE NETWORK

[75] Inventors: John Grady, Fairfax, Va.; Kenneth Hand, Silver Spring; John Modrowsky, Burtonsville, both of Md.; Arthur A. Richard, III, Springfield, Va.

[73] Assignee: Bell Atlantic Network Services, Arlington, Va.

[21] Appl. No.: 99,381

[22] Filed: Jul. 30, 1993

Related U.S. Application Data

[63] Continuation-in-part of Ser. No. 42,107, Apr. 1, 1993, abandoned, Ser. No. 766,535, Sep. 27, 1991, Pat. No. 5,247,347, and Ser. No. 42,270, Apr. 2, 1993, Pat. No. 5,410,343.

[51] Int. Cl.⁶ .......................... H04N 7/14; H04M 11/00
[52] U.S. Cl. .................... 348/7; 348/12; 348/14; 379/93; 379/96; 379/105; 455/4.2
[58] Field of Search .................... 379/105, 102, 379/104, 94, 93, 96–98; 348/6–8, 10–13; 455/4.2; H04N 7/10, 7/12, 7/14

[56] References Cited

U.S. PATENT DOCUMENTS

| | | |
|---|---|---|
| 3,766,324 | 10/1973 | Budrys et al. . |
| 4,332,980 | 6/1982 | Reynolds et al. . |
| 4,381,522 | 4/1983 | Lambert . |
| 4,506,387 | 3/1985 | Walter . |
| 4,654,866 | 3/1987 | Bottle et al. . |
| 4,755,872 | 7/1988 | Bestler et al. . |
| 4,761,684 | 8/1988 | Clark et al. . |
| 4,763,191 | 8/1988 | Gordon et al. . |
| 4,792,849 | 12/1988 | McCalley et al. . |

(List continued on next page.)

FOREIGN PATENT DOCUMENTS

| | | |
|---|---|---|
| 2193420 | 2/1988 | United Kingdom . |
| 2207838 | 2/1989 | United Kingdom . |
| WO92/12599 | 7/1992 | WIPO . |

OTHER PUBLICATIONS

"HDTV and Fiber Optic Communications–An Opinion"; Arpad G. Toth; pp. 1–11, Phillips Laboratories, North American Philips Corp., Briarcliff Manor, New York, EIA Digital ATV Workshop, Nov. 1989.

"Integrated Voice, Data, and Video In the Local Loop"; Neale C. Hightower; pp. 0915–0919, ® 1986 IEEE, Globecom, 1986.

"Heathrow–Experience and Evolution"; John Bourne, Mark Balmes, Jim Justice; pp. 1091–1095, ® 1990 IEEE, ICC 90.

(List continued on next page.)

Primary Examiner—Wing F. Chan
Attorney, Agent, or Firm—Lowe, Price, LeBlanc & Becker

[57] ABSTRACT

A public switched telephone network for providing information from a multimedia information server to any one of a plurality of subscriber premises, comprises a central office receiving multimedia information signals from a multimedia information server and orders from a prescribed subscriber. The central office includes a gateway system for conveying routing data in response to subscriber orders and a switch for routing multimedia signals from the server to the prescribed subscriber in accordance with the routing data. An interface at the central office transmits and receives audio telephone service signals, subscriber control signals and digital multimedia information signals on first, second and third signal channels. Each subscriber premises includes an interface for transmitting and receiving audio telephone service signals, subscriber control signals and digital multimedia information signals on the three signal channels. A plurality of subscriber local loops interconnect each subscriber interface and the central office interface. Multimedia information is collected from information providers and stored at media servers that provide a library of data and control sessions. Software modules at the media servers and resident terminals enable interactive multimedia session building, sharing of databases and joint authoring of multimedia presentations.

28 Claims, 8 Drawing Sheets

U.S. PATENT DOCUMENTS

| | | |
|---|---|---|
| 4,797,913 | 1/1989 | Kaplan et al. . |
| 4,807,023 | 2/1989 | Bestler et al. . |
| 4,829,372 | 5/1989 | McCalley et al. . |
| 4,847,829 | 7/1989 | Tompkins et al. . |
| 4,849,811 | 7/1989 | Kleinerman . |
| 4,852,154 | 7/1989 | Lewis et al. . |
| 4,890,320 | 12/1989 | Monslow et al. . |
| 4,891,694 | 1/1990 | Way . |
| 4,897,867 | 1/1990 | Foster et al. . |
| 4,949,187 | 8/1990 | Cohen . |
| 4,995,078 | 2/1991 | Monslow et al. . |
| 5,010,399 | 4/1991 | Goodman et al. . |
| 5,014,125 | 5/1991 | Pocock et al. . |
| 5,130,792 | 7/1992 | Tindell et al. . |
| 5,132,992 | 7/1992 | Yurt et al. . |
| 5,133,079 | 7/1992 | Ballantyne et al. . |
| 5,198,899 | 3/1993 | Cang . |
| 5,247,347 | 9/1993 | Litteral et al. . |

OTHER PUBLICATIONS

"The Heathrow Broadband Access System", Alan F. Graves; pp. 1675–1679, © 1989 IEEE, Globecom 1989.

"Customer–Controlled Video Switching For Teleconferencing"; Keith J. Allen and Thomas K. Helstern; pp. 0907–0914, © 1986 IEEE, Globecom 86, Bell Communications Research.

"Narrowband and Broadband ISDN CPE Directions"; Daryl J. Eigen; pp. 39–46, © 1990 IEEE Communications Magazine.

"Multimedia Document Structure for Dialog Communication Service"; Naoki Kobayashi, Toru Nakagawa; pp. 0526–0531, © 1991 IEEE, ICC 91, NTT Human Interface Laboratories.

"A Proposal of Multimedia Document Architecture and Video Document Architecture"; Wataru Kameyama, Tsuyoshi Hanamura, Hideyoshi Tominaga; pp. 0511–0515, © 1991 IEEE, ICC 91, Dept. of Electronics and Communication Engineering WASEDA University.

"Object Representation For Multimedia Document Interchange"; Magda M. Mourad; pp. 0532–0539, © 1991 IEEE, ICC 1991; IBM Thomas J. Watson Research Center.

"Evolutionary Architectures and Techniques for Video Distribution on Fiber"; Stuart S. Wagner, Ronald C. Manendez; pp. 17–25, © 1989 IEEE; IEEE Communications Magazine Dec. 1989.

"Technologies Towards Broadband ISDN"; Kazuo Murano, Koso Murakami, Eisuke Iwabuchi, Toshio Katsuki, Hiroshi Ogasawara; pp. 66–70 © 1990 IEEE; IEEE Communications Magazine.

"Can PON go broadband?"; Carl P. Engineer; 3 pages of text, Telephony–Jan. 14, 1991.

"Television Coding For Broadband ISDN"; Jules A. Bellisio and Shuni Chu; pp. 0894–0900, © 1986 IEEE; Globecom 86; Bell Communictions Research, Inc.

"An Approach to the multifunction Graphic Terminal for the ISDN Environment"; Takashi Komiya, Yasunobu Suzuki, Hajime Yamada and Keiko Tomita; pp. 0032–0036, © 1988 IEEE; Globecom 1988; OKI Electric Ind. Co., Ltd. ISDN Development Division.

"Low–Cost Digital Passive Optical Networks"; A. R. J. Cook, D. W. Faulkner, P. J. Smith, R. A. Lobbett; pp. 0659–0662, © 1990 IEEE; ICC 1990; British Telecon Research Lab.

"ATV Multiport Receiver An Overview of the EIA ATV Technical Subcommittee Work"; Arpad G. Toth, Joseph Donahue; 18 pages of text, EIA Digital ATV Workshop; Nov. 7, 1989.

"Optical Networks for Local Loop Applications"; David W. Faulkner, David B. Payne, Jeffrey R. Stern and John W. Ballance; pps. 1741–1751, © IEEE 1989, Journal of Lightwave Technology, vol. 7, No. 11, Nov. 1989.

"Passive Optical Subscriber Loops With Multiaccess"; Yih-–Kang, Maurice Lin and Dan R. Spears; pp. 1769–1777, © 1989 IEEE, Bellcore; Journal of Lightwave Technology; vol. 7, No. 11 Nov. 1989.

"Comparison of Discrete Cosine Transform and Vector Quantization of Medical Imagery"; Barry G. Haskell and Hsueh–Ming Hang; pp. 339–408, SPIE vol. 626 Medicine XIV/PACSIV (1986).

"Distributed Desktop Conferencing System (MERMAID) Based on Group Communication Architecture"; Kazutoshi Maeno, Shiro Sakata and Toyoko Ohmori; pp. 0520–0525, © IEEE 1991; ICC 1991.

"Video Services on Copper"; Milton M. Anderson; pp. 0302–0306, © IEEE 1991; ICC 1991.

"System Architecture for a Large Scale Video on Demand Service"; W. D. Sincoskie; Computer Networks and ISDN Systems 22 (1991); pp. 155–162; © 1991 Elsevier Science Publishers.

"To PON or not to PON? That is the question"; John S. McConnell; 4 pages of text Telephony–Jan. 14, 1991.

"Break on Through to the other Side"; George T. Hawley; 7 pages of text Telephony–Jan. 14, 1991.

Joseph W. Lechleider, "High Bit Rate Digital Subscriber Lines: A Review of HDSL Progress," *IEEE Journal on Selected Areas in Communications*, vol. 9, No. 6, Aug. 1991, pp. 769–784.

Earl E. Manchester, "New Uses for Residential Copper," *Telephony*, Jun. 10, 1991, pp. 27, 28 and 32.

Waring et al., "Digital Subscriber Line Technology Facilitates a Graceful Transition from Copper to Fiber," reprinted from *IEEE Communications Magazine*, vol. 29, No. 3, Mar. 1991.

Stanford University, Study Project: "Performance Evaluation of a Multichannel Transceiver System for Asymmetric Digital Subscriber Lines," dated Dec. 12, 1990, distribution to American National Standards Institute T1E1.4 Technical Subcommittee Working Group Members (partial copy).

Bellcore, Technical Memorandum, "Asymmetrical Digital Subscriber Lines", TM–TSY–015008, completion date Sep. 14, 1989.

ISSIS 78, 24 Mar. 1978, Atlanta Georgia, US pp. 44–48, Coyne et al. "Integrated Broadband Distribution System For Low Density–Rural Areas Using Optical Fiber Transmission".

ICC '91, 26 Jun. 1991, Denver, Colorado, US pp. 842–846, Gelman et al., "A Store and Forward Architecture for Video–On–Demand Services".

CATV Sessions, 13 Jun. 1987, pp. 426–435, Seguin, "Optical Fibre Local Networks for Distribution and Interactive Services".

"Digital Multimedia Systems " Communications of the ACM, vol. 34, No. 4 (1991). Talk given at the Motion Picture Industry Seminar, Dec. 3, 1984 "Dial–A–View", by A. F. Bulfer.

"A trial of a National Pay–Per–View Ordering and Billing System" by Andrew Bulfer et al., NCTA Technical Papers (1986).

"BERKOM Test Network and BISDN/CATV Concept" by G. Domann, Electrical Communication, vol. 62, No. 3/4 (1988).

"Visual Telephony as an ISDN Application", by Ming Liou, IEEE Communications Magazine (1990).

"1.544-Mbit/s Transmission of TV Signals by Interframe Coding System," by H. Yasuda et al., IEEE Transactions on Communications (1976).

"Enhanced Video Response System-VRS Phase II,-" by H. Nakajima, Japan Telecommunications Review (1979).

"Video Response System-VRS-," by K. Haji, International Conference on Communication (1978).

"Dial V for Video", Video Magazine dated Mar. 1982.

"MCPIC: A Video Coding Algorithm for Transmission and Storage Applications," by A. Wong et al., IEEE Communications Magazine (1990).

Multimedia Solutions, vo. 2, No. 2, Mar./Apr. 1992, editor Larry Baratto (entire magazine).

Project Edison: A Plan for a Multi-media Extended Classroom Experiment, L. M. Gomez, C. N. Judice and J. Grady, pp. 770–778, Globecom 92, IEEE Global Telecommunications Conference 1992.

Bellcore Exchange, Jan. 1993, Issue One, John S. Schafer, editor.

News Release, Bell Atlantic, "Bel Atlantic and AT&T Announce New Technology To Benefit Education", Oct. 29, 1991, four pages.

Bell Atlantic News, "Union City Selected For Education Services Trial", Apr. 30, 1992, six pages.

IEEE Communications Magazine, vol. 30, No. 7, Jul. 1992, pp. 36–41, Sutherland et al. "Residential Video Services".

METHOD AND SYSTEM FOR ACCESSING MULTIMEDIA DATA OVER PUBLIC SWITCHED TELEPHONE NETWORK

CROSS-REFERENCE TO RELATED APPLICATION

This application is a continuation-in-part of application Ser. No. 08/042,107, filed Apr. 1, 1993 (now abandoned), and a continuation-in-part of application Ser. No. 07/766,535, filed Sep. 27, 1991 (now U.S. Pat. No. 5,247,347), a continuation-in-part of application Ser. No. 08/042,270, filed Apr. 2, 1993 (now U.S. Pat. No. 5,410,343); and each assigned to the assignee of the present invention.

TECHNICAL FIELD

The invention relates to data distribution using the Public Switched Telephone Network (PSTN), and, more particularly, to distribution of multimedia data to subscribers over a PSTN.

BACKGROUND ART

Advances in personal computer capabilities have created increased demands on data base sources to supply information to households and business. Corresponding increases in data availability, storage, retrieval and transmission capabilities have supported multimedia data presentation of information. Multimedia presentations include, in addition to conventional text, still-images, animation, slow and fast scan video, and graphics format visual presentations. Multimedia also includes sound data presented together with, or independent of, one or more visual presentations. A multimedia presentation can range from the equivalent of an electronic book including plain text in combination with still images to full motion video presentations of feature movies. Thus, multimedia spans a wide spectrum of data storage, retrieval and transmission requirements to present information in various formats to system subscribers.

Considerable potential exists to improve the availability of multimedia service to the public. One example is in education. Several segments of society find themselves remote from learning resources. Educators have traditionally tried to find a way to overcome the limitations imposed by physical distance, on one hand by using school buses to transport people and on the other by employing telecommunications to transport information. However, physical distance remains a barrier to education despite numerous experiments and studies to solve the problem. Known proposals to implement multimedia information transmission over the public service telephone network have not yet been successful, in part by the limited bandwidth of telephone cable and the unavailability of adequate technology to support copper based multimedia information transmission. Broad bandwidth transport is necessitated not only by the need to carry good quality video information from an information provider to the student, but subscriber control signals and ordinary telephone service as well.

Although optical fiber is capable of providing sufficient bandwidth, even optimistic projections of installation of fiber in the local loop expect only modest market penetration by the turn of the century and ubiquity many years after that. This invention implements the public switch telephone network (PSTN) to carry out transport of multimedia information from one source or multiple sources to a subscriber over a single loop in the form of copper wire or other medium, including fiber, to help remove distance as a barrier to information transfer at affordable cost.

DISCLOSURE OF THE INVENTION

According to one aspect of the invention, a public switched telephone network for providing information from a multimedia information server to any one of a plurality of subscriber premises comprises a telephone company central office receiving multimedia information signals from a multimedia information server and orders from a prescribed subscriber. The central office includes a gateway system for providing routing data in response to subscriber orders and a switch for routing multimedia signals from the server to the prescribed subscriber in accordance with the routing data. An interface at the central office includes a first multiplexer/demultiplexer for transmitting or receiving audio telephone service signals, subscriber control signals and digital multimedia information signals on first, second and third signal channels. Each subscriber premises includes an interface having a second multiplexer/demultiplexer for transmitting or receiving audio telephone service signals, subscriber control signals and digital multimedia information signals on the three signal channels. The interface may incorporate frequency multiplexing/demultiplexing so that the three channels are displaced from each other in frequency. A plurality of subscriber local loops interconnect each subscriber interface and the central office interface. Preferably, the central office interface comprises a plurality of interfaces, one for each subscriber.

In accordance with the preferred embodiment, the first channel is a bidirectional channel carrying audio telephone service signals between the subscriber and central office. The second channel is a bidirectional channel carrying subscriber control signals to the central office and possibly response signals from the central office, and the third channel is a unidirectional channel carrying digital multimedia information signals from the central office to the subscriber. The local loops preferably comprise copper pair wiring, although optical fiber is another possibility.

Furthermore, the subscriber interface may include a decoder for converting an incoming digital multimedia information signal to an analog signal having a video component. The decoder decompresses the incoming multimedia signal and produces analog video and associated audio output signals. Alternatively the multimedia information may incorporate uncompressed digital signals applied directly to a digital terminal, such as a personal computer.

In accordance with a particular aspect of the invention, the central office further includes a packet data network responsive to the gateway system for supplying command signals to the multimedia information server. Digital multimedia information storage, remote from the subscriber premises, buffers multimedia information and supplies the same to the central office interface.

In the preferred embodiment of the invention, the multimedia information server comprises a subscriber request processing means, responsive to subscriber request data, for supplying information request data and a session control means, responsive to the information request data, for supplying information retrieval data and output control data. Also included in the server are a data storage means, preferably comprising plural types of storage media, responsive to the information retrieval data for supplying program data and an output control means, responsive to the output control data, for supplying the multimedia information.

Another aspect of the invention involves interaction between subscribers and sources of multimedia information. In accordance with the preferred embodiment, the multimedia server system comprises a number of data bases that are transparently shared by a subscriber. When the subscriber queries a principal data base containing multimedia information and does not find the information sought, other data bases sharing resources either through the gateway system or outside the gateway, are searched.

A further aspect involves multiple subscriber interaction with the multimedia servers. Groupware functionality incorporated in subscriber resident software enables subscribers to share a session and thereby mutually contribute to a multimedia joint presentation.

Various objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Overview

Figure 1:
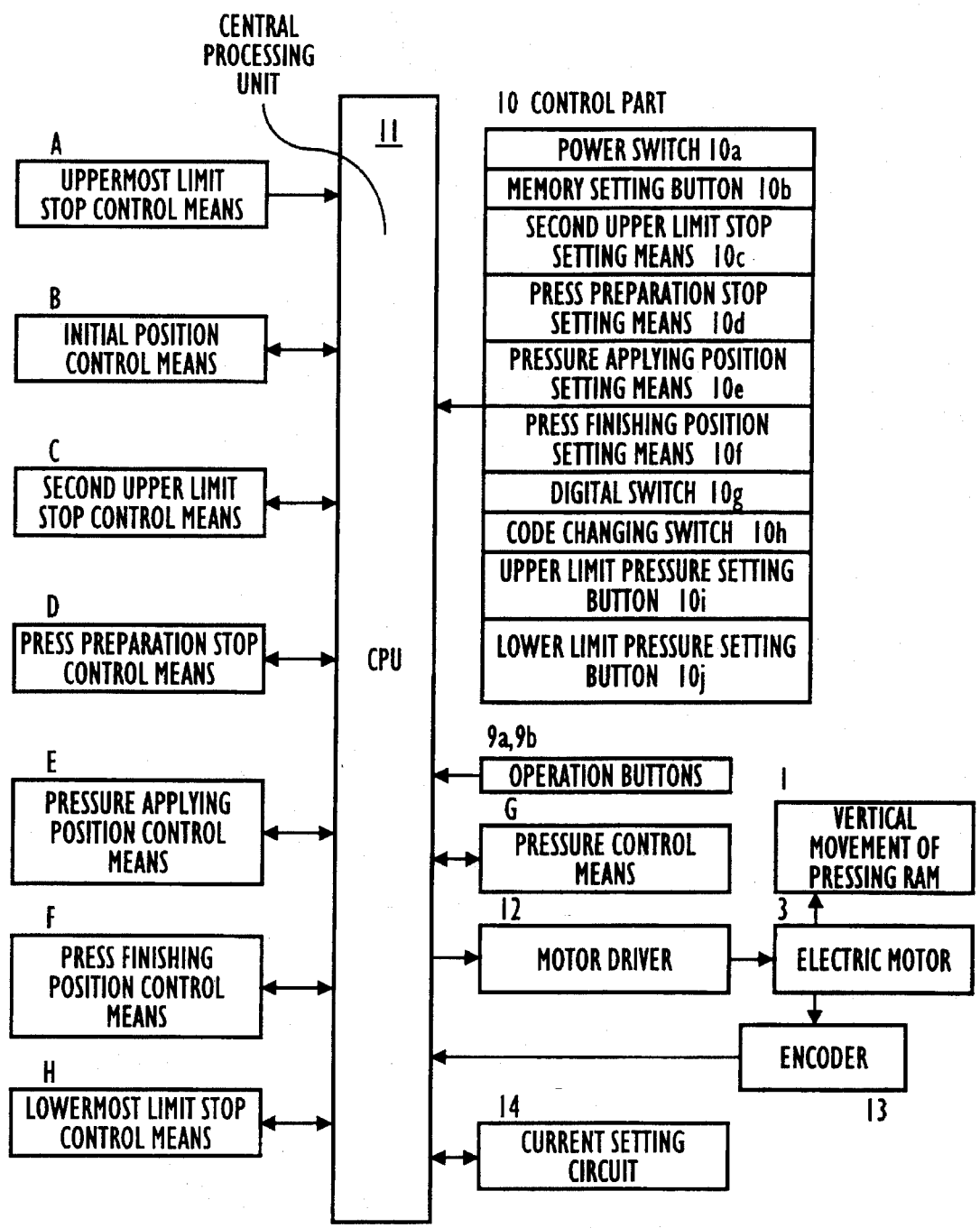
FIG. 1 is a system diagram of a PSTN incorporating flow of multimedia information from a source to a subscriber, in accordance with the invention.

The digital multimedia information service platform shown in FIG. 1 is of an architecture similar to the type described in copending application Ser. No. 07/766,535, filed on Sep. 27, 1991 and entitled PSTN ARCHITECTURE FOR VIDEO-ON-DEMAND SERVICES, incorporated by reference, modified herein to accommodate delivery of multimedia services to subscribers that include home and institutional (e.g., school) subscribers at terminals 100 and 120, respectively. The architecture for multimedia delivery, in accordance with the invention, includes four main components: at least one multimedia server 162, a gateway system 32, a central office (CO) 10 based transmission system and the subscriber terminals. The multimedia server 162 stores compressed multimedia presentations in the form of data files received from providers of multimedia information (not shown) that may reside outside the CO 10. Encoded multimedia data is stored on the multimedia server 162, in for example, digital magnetic tape or digital cassette format, at the CO 10. The server 162 may alternatively be external to the CO 10. The data may be electronically buffered for transmission over a POTS line to the subscriber.

The gateway system 32 performs two main functions. It controls access to the multimedia server 162 and originates the control messages to set up a high speed link between the servers and subscriber terminals via the transmission system. The multimedia file server system 162 handles requests received from the gateway system 32 through a packet data network 40 and provides a multimedia file feed to the subscriber via the network link. The server is a file management system responsible for inputting multimedia files from providers, storing these files or passing the real-time data through to the subscriber, keeping track of sessions, handling all interactive control requests from the subscriber, and controlling all outputs.

The transmission system uses a transmission medium of optical fiber or of telephone cable carrying separate channels of audio telephone service, single direction subscriber control signals and multimedia signals, multiplexed/demultiplexed at central office and subscriber interfaces. Alternatively, a public switched telephone network coupled with a Public Data Network (PDN) or an Integrated Services Digital Network (ISDN) may be used. Data can be packetized in the PDN and transmitted to the gateway system 32. When ISDN is used, the data are packetized in the subscriber terminal itself, which preferably is in the form of a personal computer. The data alternatively may be synchronized data.

Utilizing a communications application program in the terminal, the subscriber sets up a connection to the gateway system 32. The gateway 32 validates the subscriber through a log-in sequence and presents a menu of available multimedia presentations or other forms of data from which the subscriber can choose. When a choice has been made, the gateway system 32 provides the multimedia server 162 with the selection information and the network address of the subscriber. The server assigns a spare port over which it will transmit the information and passes identification of this port back to the gateway. The gateway 32 combines the port identification with the customer identification, and passes both pieces of information via network 40 to a digital cross connect (DCC) management system 26, which controls cross connect switch (DCS) system 24 to set up a temporary connection between the relevant input and output ports. When the connection has been established, the subscriber may interact with the multimedia application by sending commands to the multimedia server 162 and receiving responses at the subscriber's terminal or work station. The server 162 may, if necessary, access information from another multimedia server to satisfy a particular request for information.

The multimedia presentation can be full motion video, text, graphics, animation, audio information, etc. Alternatively, the complete multimedia presentation may be transferred to the subscriber terminal where it will be stored locally in a high capacity storage device. All interactions between the subscriber and the multimedia presentation will then occur locally at the subscriber terminal. Through use of resource sharing programming, subscribers can share a session, jointly accessing the server and authoring a multimedia presentation, a capability particularly useful to students.

The platform adopts existing components of the Public Switched Telephone Network (PSTN) and implements compression techniques to store multimedia information for subsequent forwarding over interoffice facilities. The switching facilities are located in central offices serving residential subscribers. Loop electronic devices modify the transmission characteristics of the local copper loop to provide required enhancement to the PSTN and permit delivery of full multimedia information.

High data rate types of multimedia data are encoded to conserve system resources. For example, analog information is first converted to a digital format and then compressed using, for example, encoding algorithms standardized by the International Standards Organization (ISOs) Motion Picture Experts Group (MPEG). Another example is the JPEG standard for images. Each title comprises information stored by a media server as an addressable data file in conventional data processing devices functioning as a video library. Establishing and monitoring connections which link a library port transmitting selected information with the end subscriber ports that receive the information are performed by a supervisory controller such as a network control system, e.g., FLEXCOM (TM) software, used to control an electronic digital cross-connect switch system 24 in the PSTN. The DCS 24, also used for switching two-way DS-1 rate transmissions, is adapted to additionally provide bridging or broadcast of multimedia information to several subscribers.

Subscriber local loops having ends equipped with asymmetric digital subscriber line (ADSL) devices 18, 124 are connected to the DCS 24. The multimedia distribution system provides for the simultaneous transport of a one-way 1.544 megabit per second (MBPS) signal over the same twisted pair transmitting voice messages to the residential subscriber. The ADSL transported signal is demultiplexed and the 1.544 Mbit portion is then decoded using appropriate standard techniques to deliver a multimedia information signal.

It can be anticipated that fiber optic technology will replace existing coaxial and twisted pair connectivity with corresponding enhancements made to switching and routing equipment in the PSTN. Hence, with reference to FIG. 1, assume the subscriber is a school or other site having multiple student terminals, as at institutional site 100. Connectivity from the multimedia server on optical fiber may be multiplexed to student terminals on separate DS1 channels (not shown). Each student will communicate with the server through a personal computer to develop a multimedia presentation. As will be described later, in accordance with an aspect of the invention students are enabled to share a common session with the server, or with multiple servers.

PSTN Architecture

Referring now to FIG. 1 in more detail, PSTN central office (CO) equipment 10 provides connectivity from information providers (not shown) to media server system 162 and subscribers 100 and 120. CO 10, which may but not necessary is telephone company central office equipment, includes a conventional voice switch that includes conventional elements to detect off-hook, service requests, call completion (i.e., ring trip), a DTMF decoder and dial pulse detector. The voice switch also includes a telephone call connection switch for routing voice circuits among the various ports. These elements are all conventional.

An institutional or residential subscriber at premises 100, 120 is connected to the CO 10 through an interface consisting of an asymmetrical digit subscriber line (ADSL) system. The ADSL system comprises a pair of ADSL devices 124 and 18 on the subscriber and CO ends of the subscriber loop 20 for multiplexing (i) voice and signaling information from the CO voice switch and (ii) digital multimedia data from DCS 24.

In addition to providing multimedia programming, the server system 162 accepts multimedia programming from multimedia information providers for later transmission.

ADSL system 18, 124 multiplexes data on subscriber loop 20 using frequency domain multiplexing, dividing the available loop bandwidth into multiple segments or channels. However, other types of multiplexing, such as time domain (TDM), are possible. Base band audio and signaling below 4 kilohertz (kHz) provides connectivity for a conventional telephone services available on the "plain old telephone system" (POTS). Alternatively, ISDN channel requirements consume the bottom 80 kHz of loop bandwidth. Reverse channel digital packet information is positioned between 80 and 90 kHz providing approximately 16 kilobits per second (kbps) connectivity from the subscriber premises to a packet switched network such as ISDN network 12 over a D-channel interface. Compressed multimedia data is contained between 100 and 400 kHz to provide a 1.6 MBPS channel for transporting the multimedia data over subscriber loop 20 to premises 100/120.

Figure 6:
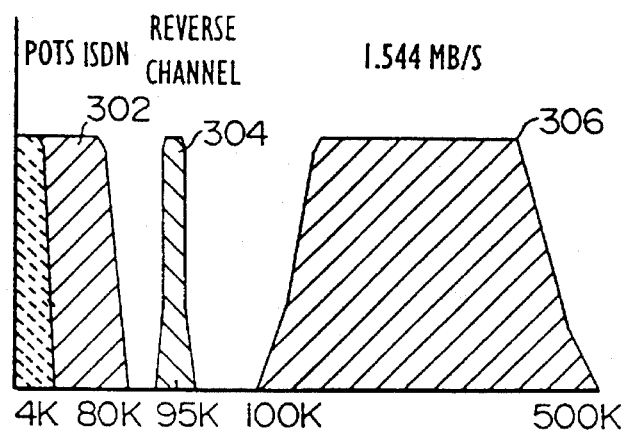
FIG. 6 is a spectrum diagram showing channelization of a local loop by the interface unit.

ADSL 18 carries out error correction and, as shown in FIG. 6, divides the available loop bandwidth into three channels 302, 304 and 306. Base band audio and signaling below 4 kilohertz (kHz) provide connectivity for a conventional telephone services available on the "plain old telephone system" (POTS). Alternatively, ISDN channel requirements consume the bottom 80 kHz of loop bandwidth. Reverse channel digital packet information, centered on 95 kHz., provides 8 kilobits per second (kbps) of handshaking protocol between the subscriber- and CO-side ADSLs 124 and 18 to test the copper pair transmission path, and approximately 16 kbps connectivity from the subscriber premises to a packet switched network, such as the ISDN network over a D-channel interface. The 16 kbps signal is stripped by the ADSL 18 and sent to the CO 10. Compressed digital video information is contained within the frequency range of about 100 and 500 kHz to provide about a 1.6 mbps (1.544 mbps) channel for transporting video/audio data over loop 20 to subscriber premises 120.

The frequency channel represented by segment 302 in FIG. 6 thus establishes a 2-way channel used to provide standard POTS service or ISDN (2B+D) service over the subscriber loop 20. Channel 304 is an up-stream only (subscriber to CO), low speed data channel. 8 kbps of this channel are used for transfer of operations, administration, maintenance, and provisioning (OAM&P) data for the ADSL unit. Optionally, the channel may provide response messages or the like from the CO, and hence, may be considered a bidirectional channel. The remaining 16 kbps, compatible with X.25 or D channel interfaces of BRI-ISDN, is used to interface with a packet switch allowing the subscriber to interact with the network and/or the 1.544 mbps signal provider.

Channel 306 carries a down-stream only (CO to subscriber) digital signal providing 1.544 mbps transport (1.6 mbps with overhead) for carrying the digitized compressed video signal. The lower edge of channel 306 is set at 120 kHz., chosen to minimize channel loss and allow appropriate bandwidth for base band channel 302 and reverse channel 304 and to minimize interference from impulse noise. The combined digital down-stream signal utilizes the DS1 bit map specified by ANSIT1.403-1989.

Because data channels 304 and 306 are unidirectional (although channel 304 optionally may be operated bidirectionally, as mentioned above), the system does not experience self-NEXT (near end cross-talk). This allows concentration on the interface and interference from impulse noise because the ADSL system is loss-limited rather than NEXT limited. Impulse noise exposure can be reduced by using a pass band technique as opposed to a base band approach since impulse noise affects are greatest below 40 kHz. Therefore, a modulation technique such as Quadrature Amplitude Modulation (QAM) is preferred over a 2B1Q base band system.

Figure 5:
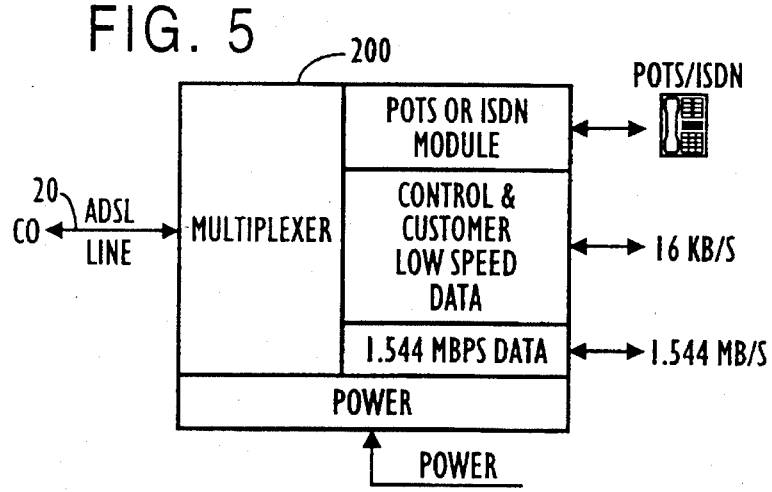
FIG. 5 is a functional diagram of a subscriber interface unit.

ADSL multiplexer 200 shown functionally in FIG. 5, within each ADSL unit 18, 124, supports transmission of a one-way 1.544 mbps digital signal along with a POTS or a BRI-ISDN signal over a single non-loaded copper pair. This configuration provides service to a customer over copper loop lengths of up to 18,000 feet, conforming with Carrier Serving Area (CSA) and resistance design rules. Discreet multi-tone is an alternative.

Figure 8:
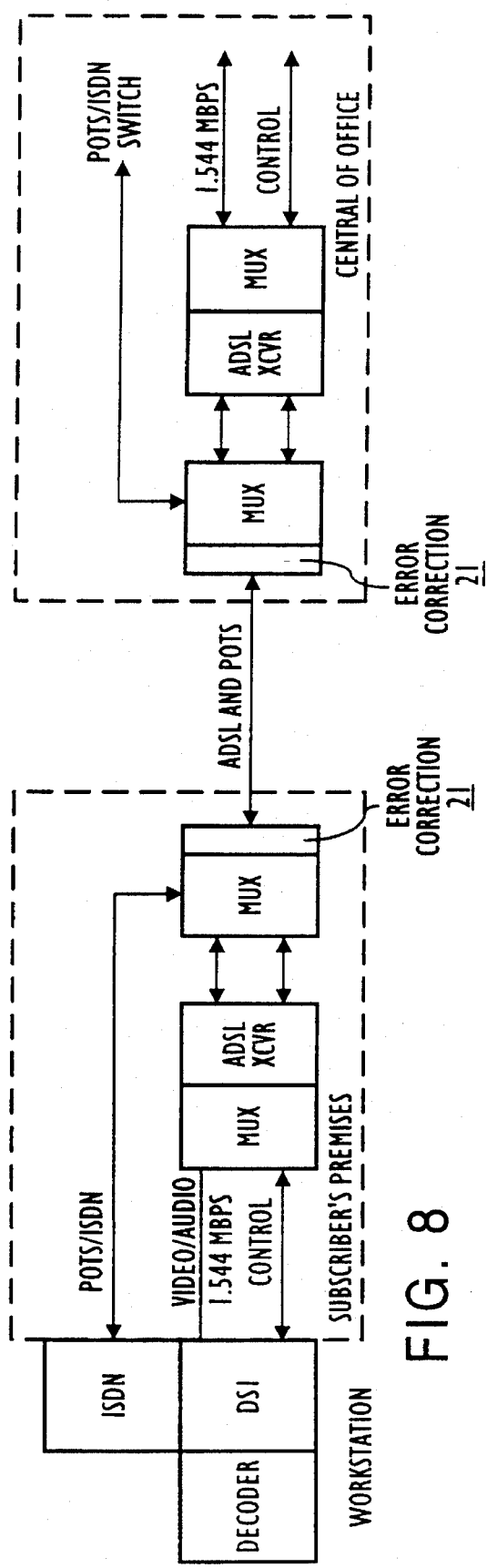
FIG. 8 is a block diagram of the interface unit in the form of an asymmetrical digital subscriber line (ADSL) system providing simplex high-bit-rate access and POTS on a common copper loop.

The ADSL system (the hardware block diagram is shown in more detail in FIG. 8) provides simplex high-bit-rate video data and POTS connectivity to a subscriber over a common copper loop with transport capability to deliver a one-way high-bit-rate data stream with POTS or ISDN basic access multiplexed at baseband. Each ADSL on the subscriber- and CO- sides includes an error correction circuit 21 implementing an error correction algorithm, such as the Reed-Sullivan algorithm, for correcting errors that arise as a result of transmission of data on a twisted pair of copper lines. The subscriber- and CO-side ADSLs on opposite ends of the twisted copper pair carry out "handshaking" while implementing the algorithm to reduce error in the video signal to a minimum.

The multiplexer 200 residing in each subscriber-side ADSL includes, in addition to a frequency converter for channelizing the incoming signal into 1.544 Mbps, 16 Kbs and 8 Kbps components, a splitter/filter (not shown) for separating the standard POTS signal from the multimedia composite. Hence, the multimedia component incoming on the twisted copper pair is transparent to a standard phone resident on the line at the usual network interface device (NID).

Subscriber and CO ADSL interface units 124 and 18 are synchronized to ensure that both subscriber and CO side units derive timing from one master clock to prevent data loss. Preferably, the units derive timing from the incoming 1.544 mbps signal. Subscriber end ADSL equipment is powered locally from the customer premises; CO end ADSL equipment is preferably powered by an external source of DC input voltage in the range of between −42.5 and −55 VDC.

Figure 7:
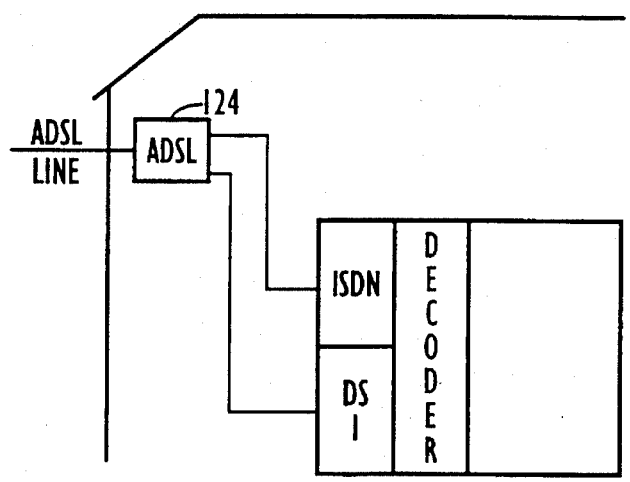
FIG. 7 shows a typical in-the-home configuration providing video transported over a 1.544 MBPS channel overlaid with standard telephone service signaling.

FIG. 7 shows a typical in-the-home configuration which provides multimedia information transported over the 1.544 mbps channel. The unidirectional 1.544 mbps signal carried by the ADSL system has either a Superframe Format (SF) or an Extended Superframe format (ESF). The Superframe format consists of 24 consecutive 8-bit words preceded by one bit, called the framing bit (F-bit), for a total of 193 bits per frame. The F-bit is time-shared to synchronize the ADSL interface equipment and to identify signaling framing. Twelve consecutive frames form a Superframe. A line code used with a Superframe format is bi-polar return-to-zero, also known as Alternate Mark Inversion (AMI).

The ESF format consists of 24 consecutive frames, each of which includes 192 information bits preceded by 1 F-bit for a total of 193 bits per frame. The F-bit is used for basic frame synchronization, a cyclic redundancy check and a data link. Twenty-four frames form a Superframe. The line code used with the ESF is either AMI, bi-polar 8-zero substitution (B8ZS), or AMI with Zero-Byte Time Slot Interchange (ZBTSI).

Media Server System

Figure 2:
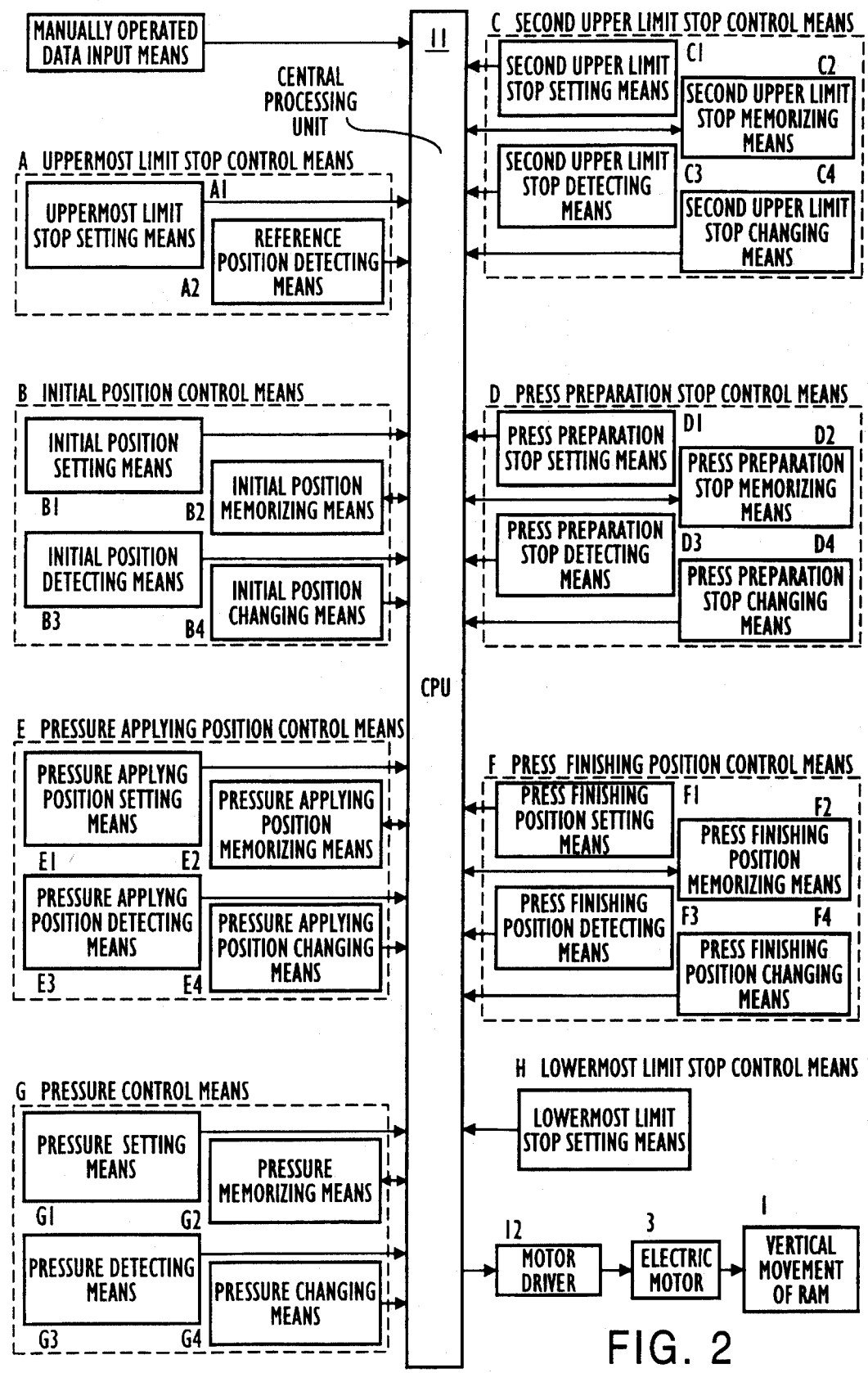
FIG. 2 is a simplified block diagram of a media server, according to the invention.
Figure 3A:
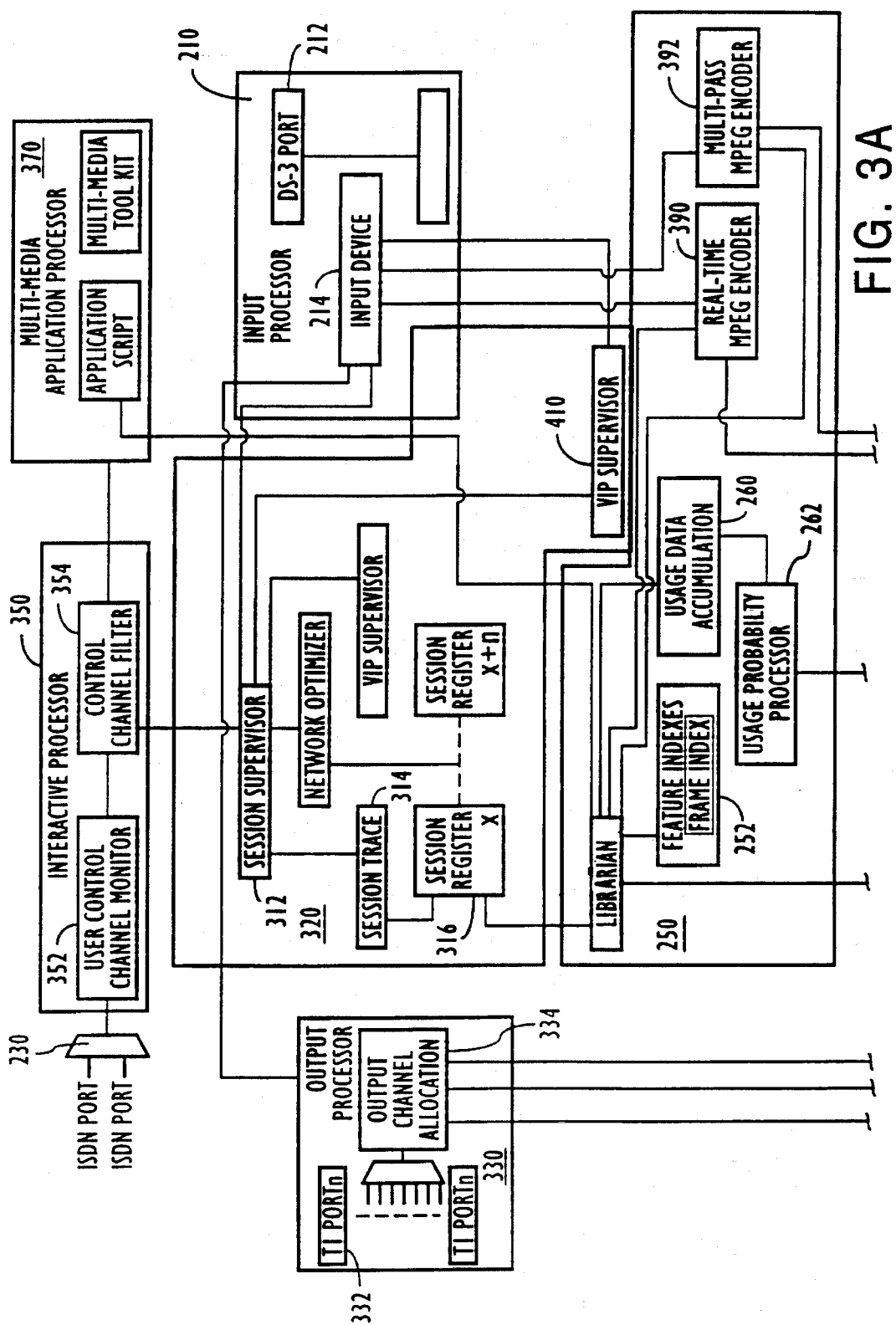
FIGS 3A and 3B are together is a more detailed block diagram of the media server of FIG. 2.
Figure 3B:
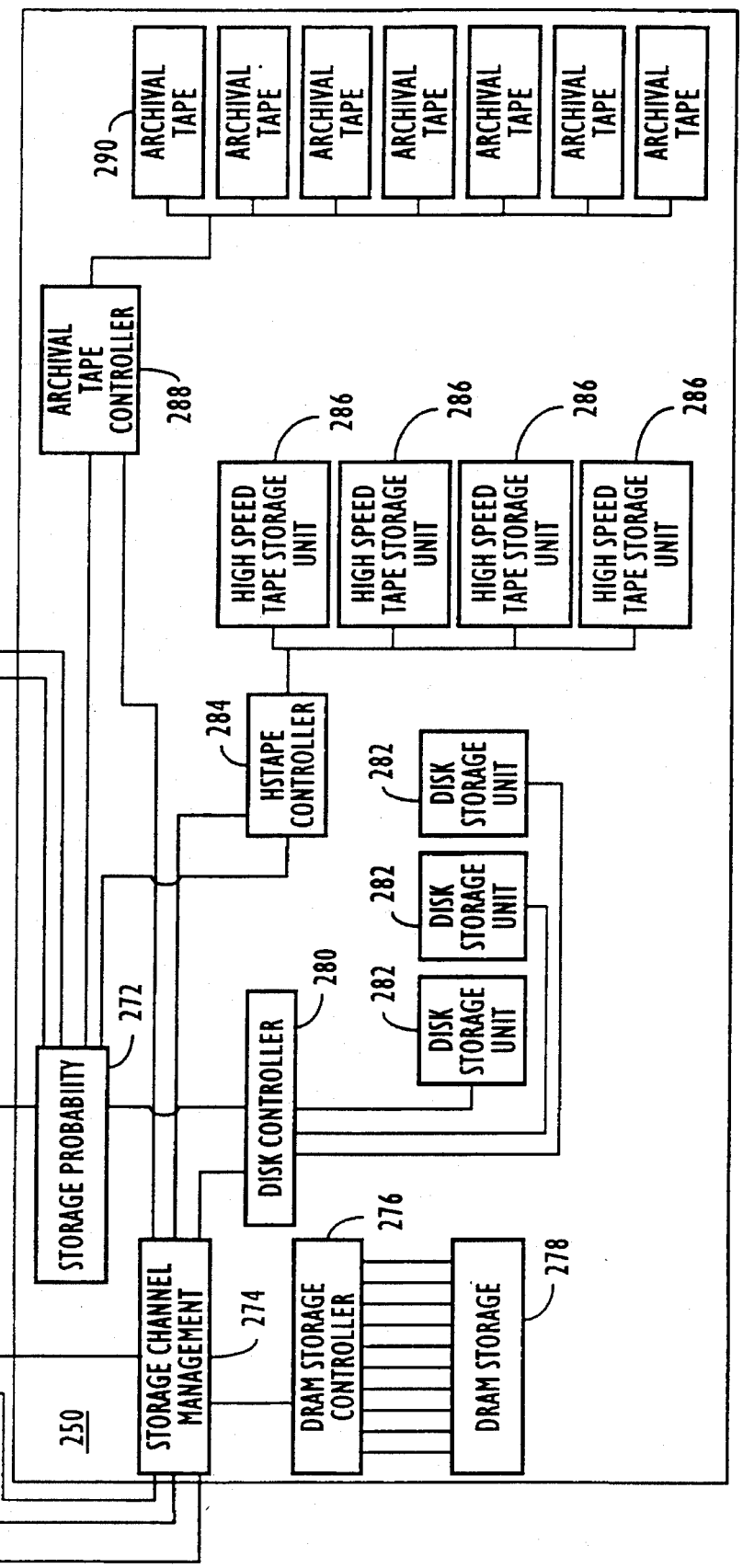
Figure 4:
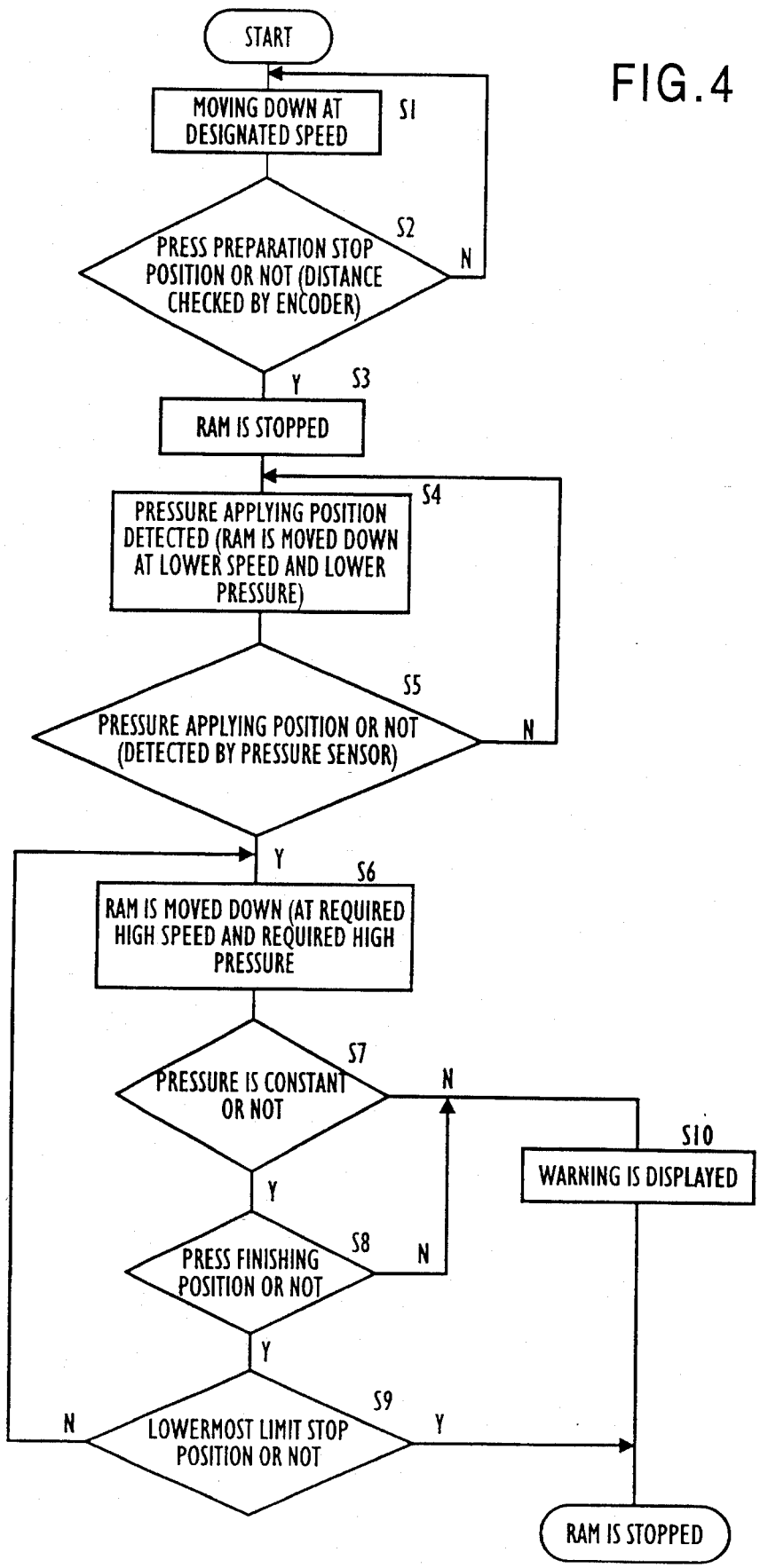
FIG. 4 is a block diagram of multimedia information storage facilities of the media server.

The media server system 162, shown in further detail in FIGS. 2–4, processes all requests from gateway system 32 for providing multimedia and video file feeds to customer premises via the DCS and ADSL systems. The media server system performs input of video and other information files from multimedia information providers, stores these files, monitors and records subscriber sessions, processes all interactive control requests from subscribers, and controls all outputs to the subscribers.

The media server system 162 also processes and supplies multimedia services including interactive learning, interactive games, and other presentations. The server stores and processes all data required for the multimedia applications including text, still pictures, audio, and partial and full motion video, as well as interactive application scripts.

Media server system 162 includes eight major components shown in FIG. 2: input device 210, Q.931 interface 230, librarian 250, storage manager 270, session manager 320, output controller 310, interactive processor 350 and multimedia application processor 370. Input device 210 includes a plurality of DS-3 Input ports 212 or other input devices for receiving multimedia data including encoded digital video signals. Alternatively, the data may be supplied from a magnetic tape or the like source of stored data. Multimedia information in MPEG or other standard of encoded format is supplied to output controller 310 or to gateway interface 410 (FIG. 3A) to be routed to session manager 320 for eventual storage by the server system.

The network control software of the media server in combination with management resources of the PSTN controls the "network session" between an output controller 310 of the media server and subscriber ports. The session manager 320 also maintains a record of relevant data regarding each session which is forwarded to a customer billing system.

Q.931 interface 230 provides connectivity between interactive processor 350 and ISDN Interface 12 (FIG. 1). Interactive processor 350 receives command data over the ISDN from subscribers running interactive programming from the media server. Interactive programs include multimedia presentations. The interactive processor 350 also receives command data from the subscriber for interactive control of multimedia applications and data objects. These commands are passed to session manager 320 for further processing and control of multimedia programming.

Data to be stored in or retrieved from memory is first routed through librarian 250 and, under its control, storage manager 270 either stores the program data or retrieves and provides previously stored program data to output processor 330.

Media librarian 250 controls distribution of video, audio, still image data and text selections to session manager 290 in response to information requests from the session manager and multimedia application processor 370. Referring to FIG. 3, the librarian further monitors and record in feature index 252 the storage location of all video selections for multimedia applications. The librarian also records a history of access to multimedia information provided during each prescribed, e.g., twenty-four hour period in usage data accumulation system 260. The usage data is supplied to usage probability processor 262 to establish an intelligent cache using DRAM storage 278 for rapid access and highly addressable storage of features.

Feature indexes 252 maintain a catalog of data and support processing for storing all locally stored multimedia information. This includes the allocation of storage media type and space, maintenance of addressing tables for program stat and frame indices, and indexes for all volumes. The program listing data is supplied to a menuing system supported by gateway 32 (FIG. 1) via packet data network 40.

Feature indexes system 252 performs required catalog maintenance functions including input of new multimedia information into the system. The catalog maintenance system determines the priority of the incoming multimedia data and allocates appropriate storage to the data. Once the file space is allocated and the file is stored, the volume indexes are updated, the frame positions of the program are calculated and frame addressing tables are created and stored. The frame addressing tables are used to address multimedia information or a data object from any position in the multimedia production.

When it is determined that stored multimedia production is no longer required, media librarian 250 removes the program data from the file catalog. The record to be deleted is then flagged by the system administrator.

The catalog system updates multimedia data as the multimedia productions are loaded into the media server. The updated catalog information is supplied by librarian 250 of the media server to gateway 32.

Storage channel management processor 274 controls the flow of data between all storage devices and output control processor 330. Input control processor 210 receives multimedia data from the multimedia information providers. Multimedia data input is accepted as appropriately encoded multimedia information. All data is stored for play at a subscriber's request.

Session manger 320 includes session supervisor 312 which manages all program sessions including system access by multimedia subscribers and input and output to, from and through the media server by multimedia information providers. Session supervisor 312 tracks and records all data considered pertinent to a subscriber's session including output port, multimedia data being played or multimedia application address, feature index data, feature frame data, and session condition.

Session supervisor 312 maintains a matrix of routing information for each session, including what subscribers are assigned to a given output port, and the source of the input data, that is, the input port of local storage. A file play clock uses the total number of frames in a given feature to estimate, by time, the frame position for that feature. This data is provided to the session registers for tracking frames for each logical subscriber session and is used to restart an interrupted session. Session supervisor 312 discontinues register updates upon detection of a session interruption.

The session supervisor also receives all requests from gateway 32 via Q.931 interface 230 and control channel filter 354 to establish a session and for file retrieval.

Interactive processor 350 processes incoming commands from subscriber sites once a session is established by the gateway. These commands include requests by multimedia work stations. The incoming data is interrogated for content and selectively forwarded to the appropriate module for processing, that is, the multimedia application processor for multimedia applications.

Control channel monitor 352 monitors each subscriber's control channel to detect a communication failure. In the event of a failure, session manager 310 is informed and corrective action is initiated.

Communications Software

Figure 9:
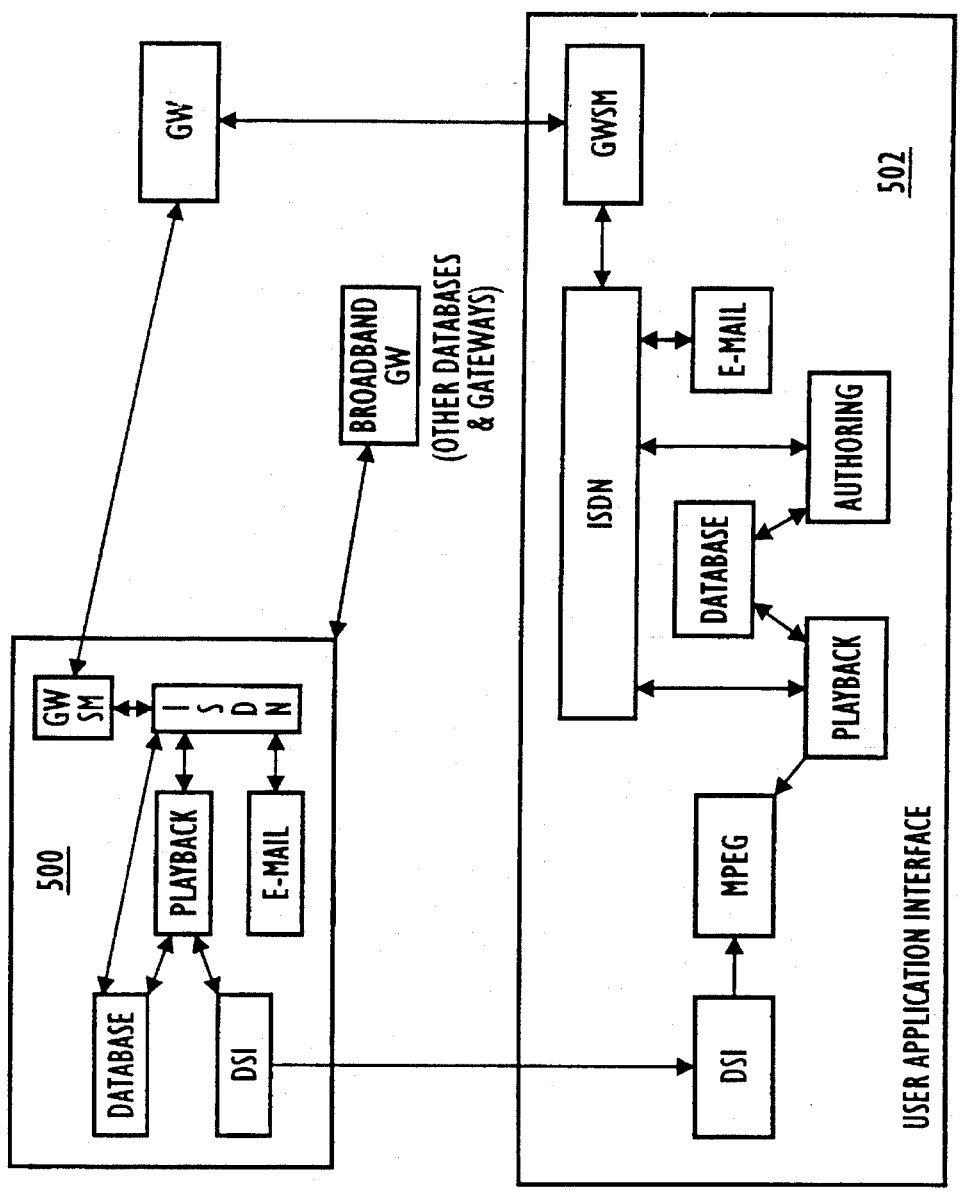
FIG. 9 is a diagram depicting interaction among server, data base and subscriber software modules, in accordance with the invention.
Figure 1:
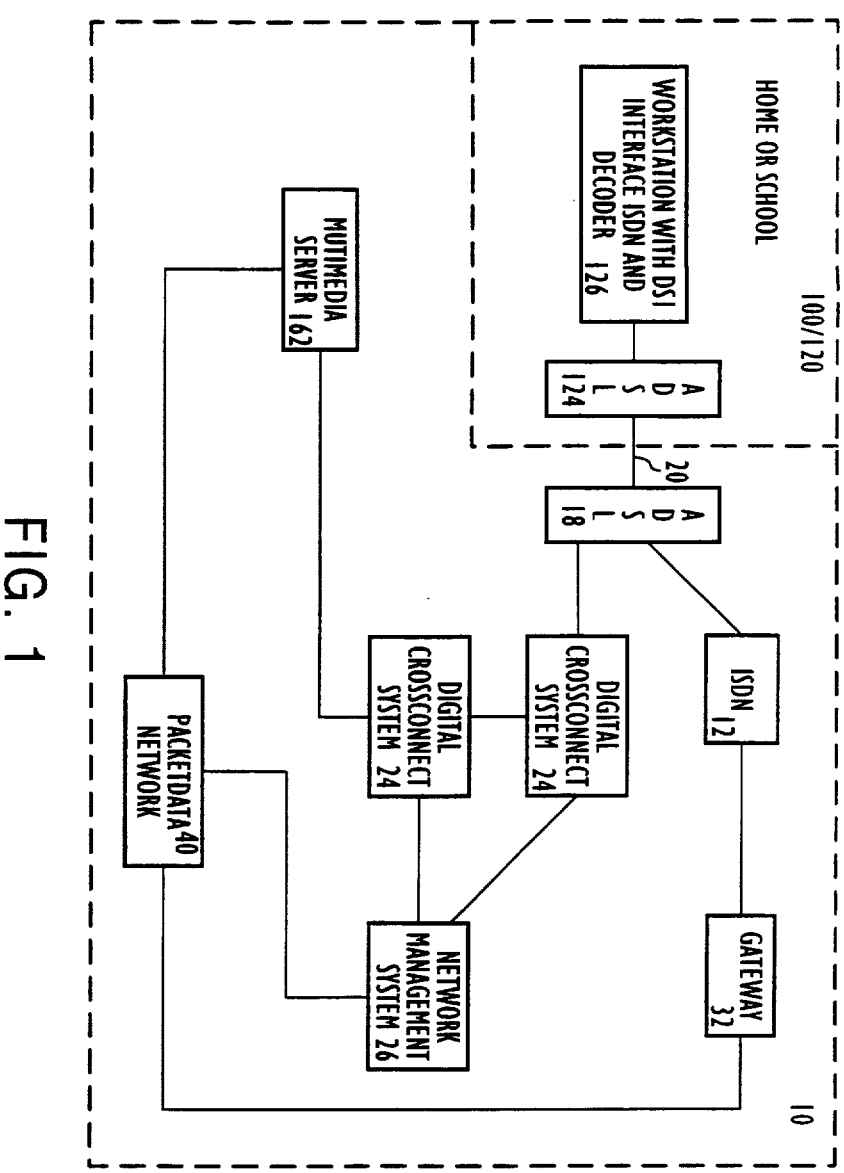
Figure 2:
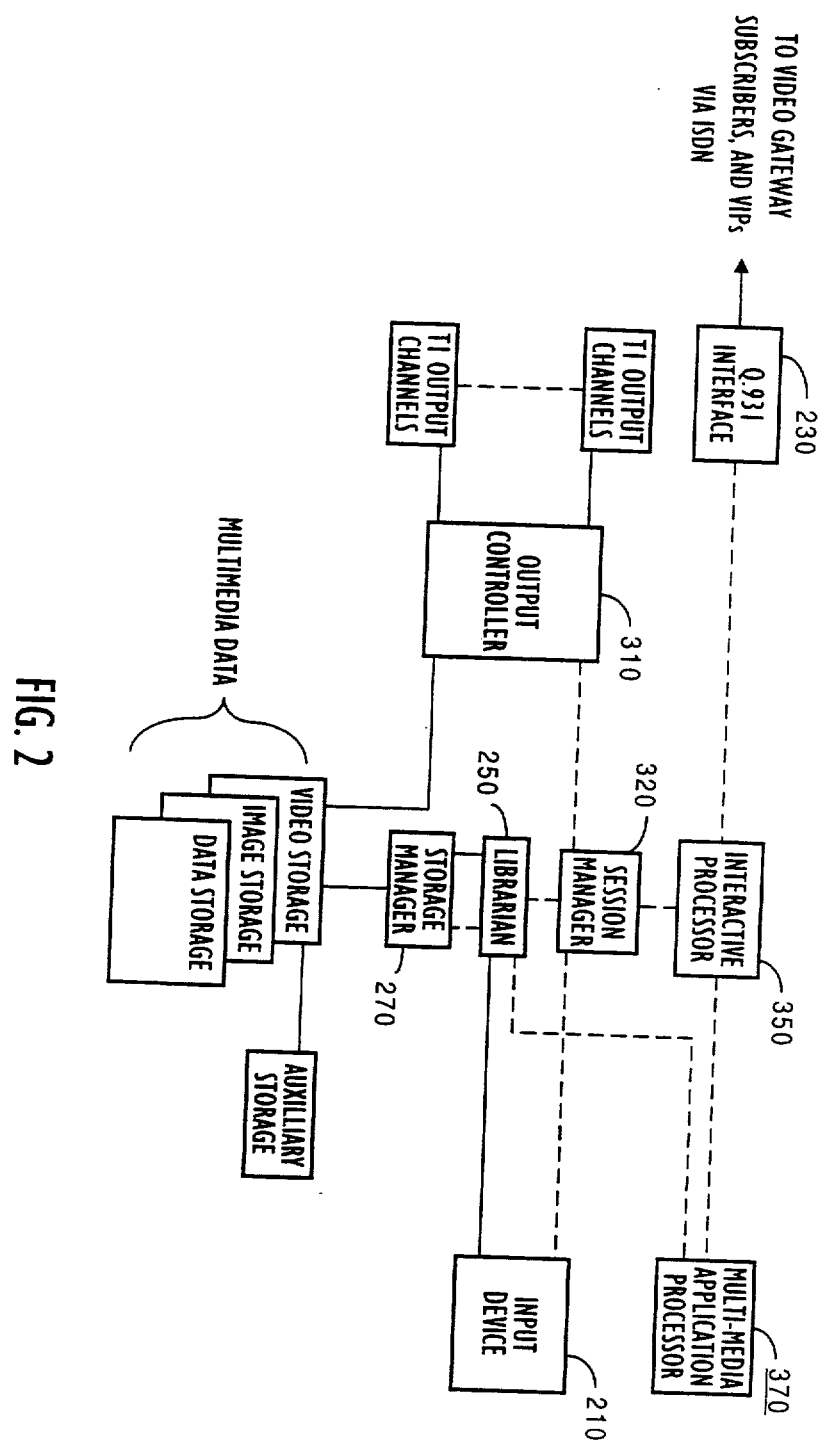
Figure 4:
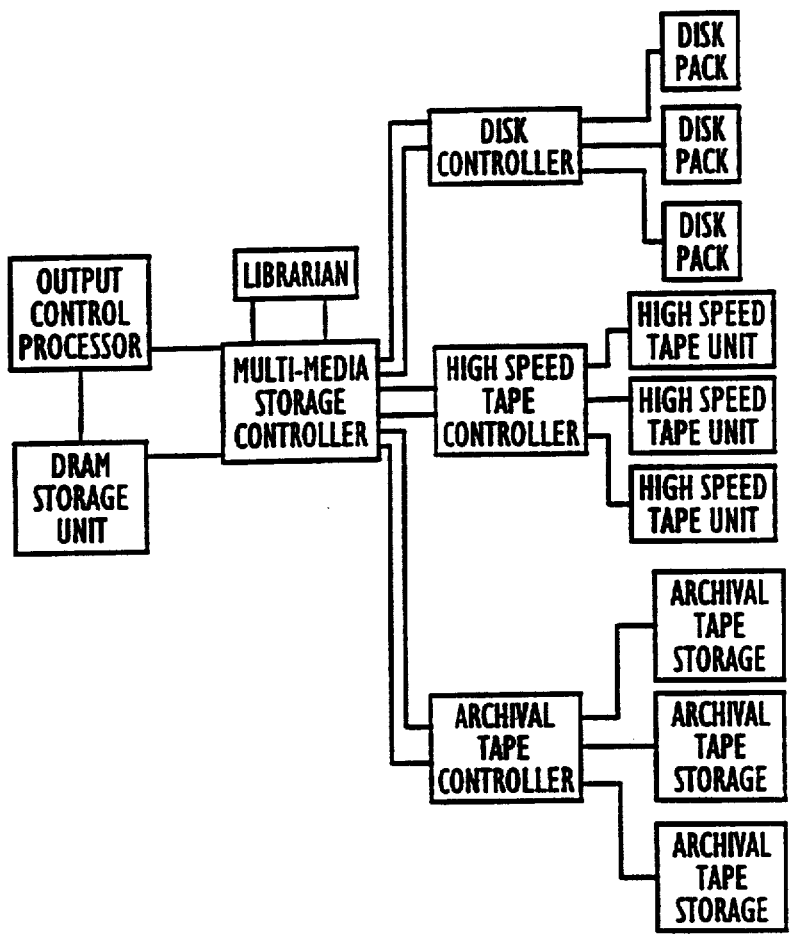

FIG. 9 shows the software architecture for setting up communications between the subscriber terminals and the gateway, in accordance with the preferred embodiment. There are two principal programming modules: a server resident module 500 and a subscriber module 502 resident at customer premises equipment, interconnected with each other through DS-1 and/or ISDN channels. Within the server resident program module 500 is a resident database for storing multimedia information derived from the media server, an interface to the gateway system 32 and control software for controlling playback of session information at the terminal. An additional general utility communication program enables dialogue to be carried out between the subscriber and server, or between subscribers cooperating in a session.

The CPE resident software contains counterpart database, control (playback) and gateway interface software. The CPE control software will respond to subscriber commands, such as the commands generated by the position of a mouse, to send a command signal to the server. The server, in turn, will interpret the command signal and transmit appropriate multimedia information on the DS-1 channel to the subscriber. In this regard, the server reads the command signal, customizes or interprets it in view of the session being conducted, and makes a decision as to what next piece of multimedia information should be presented. The resident software loads the segments of information to be sent to the subscriber into a buffer, notifies the subscriber software that the next screen is ready to be downloaded, and the multimedia information sent. The purpose of the buffer is to enable construction of a seamless multimedia session composed of multiple data files that are assembled in sequence.

Through interactive communication with the server, the subscriber is able to redirect the multimedia session at each logical branch. The subscriber supplies the various control signals to create a multimedia performance to the authoring software module that recreates a new copy of a series of old multimedia information elements. The resulting copy is saved at the server and may be accessible to other subscribers, with certain constraints, under control of a system administrator.

Alternatively, a multimedia presentation may be comprised of multiple multimedia elements that are stored in a number of buffers within the server and indexed by a script stored at the subscriber terminal playback module for each presentation. The buffer size at the server memory is dependent on the amount of time required to access the data base and retrieve the elements, and to process the elements for delivery to the subscriber. Decision alternatives available to the subscriber during an interactive session are sent by the server to the playback unit of the subscriber. The playback module in the resident software thus includes the script itself and portions of the script. For each decision point, queuing information is provided to the server so that the server can ready other presentations while the selection of the next presentation is still carried out at the subscriber terminal. For example, four selections may be queued to the subscriber, and the playback module is controlling a particular one to play out.

If the media server is found not to contain a particular piece of information sought by the subscriber, the gateway system 32 is notified by the server, and other databases may be automatically searched for the required information. These databases may be resident at different media servers.

Alternatively, the subscriber may be notified of the failure of the media server database to satisfy the current information request and the subscriber given an option to search other data bases within a single media server, at another server of the media server system or outside the server system. As another alternative, other databases, broadband channeled to the media server outside the gateway system, may be searched. Intercommunication between data bases may be performed on a switched DS-3 line implementing a broadband gateway system, as shown in FIG. 9, or within an synchronous transfer mode (ATM) environment.

Figure 10:
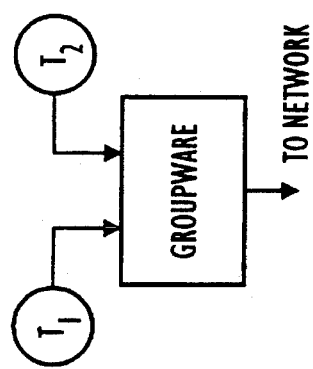
FIG. 10 shows the fundamental architecture of software for performing communications between the central office and subscribers sharing in a multimedia session.

Although a multimedia authoring session ordinarily will involve one subscriber at a time, it is possible to enable multiple subscriber terminals to share a session using known "groupware" software at the subscriber terminals, as shown in FIG. 10, or communication software such as Rainbow(TM) or PC Anywhere(TM). Alternatively, the subscribers may coauthor a multimedia presentation using two B-channels of ISDN, a separate ISDN line using a second ISDN communication board or E-mail communication between subscribers operating a common session. This enables students to jointly author a multimedia presentation, and other forms of teaming efforts to be carried out.

As still another possibility, video communications may be established between server and subscriber terminals or between subscribers. For example, subject to federal regulations, a video camera may be provided at one subscriber terminal at a classroom, and video signals sent to a second terminal where an instructor resides to enable an instructor to view students during an interactive session.

The server resident software monitors the amount of time a subscriber is on line, and together with the gateway system, performs billing operations. If the subscriber remains on line for more than a prescribed amount of time without sending any command signals to the server, the server automatically drops the line, and is free to service other subscribers. However, when the subscriber next sends a command signal, the link between the server and subscriber is automatically reestablished.

Although the present invention has been described and illustrated in detail, it is clearly understood that the same is by way of illustration an example and is not to be taken by way of limitation, the spirit and scope of the present invention being limited only by terms of the appended claims. As one example, although the network, as described, implements an ISDN interface 12, as shown in FIG. 1, an X.25 interface is an alternative. As another, although all three channels, POTS, command and video are preferably multiplexed or a common transmission medium, as described, it is also possible within the scope of this invention, to transmit and/or receive at lease one of the channels on a separate medium, such as a cellular link.

What is claimed is:

1. A public switched telephone network for providing information from a multimedia information server to any one of a plurality of subscriber premises, comprising:

a telephone company central office receiving multimedia information signals from a multimedia information server and subscriber orders from a prescribed subscriber, said central office including a gateway for providing routing data in response to subscriber orders and a switch for routing multimedia signals from said server to the prescribed subscriber in accordance with said routing data;

a central office interface for transmitting or receiving audio telephone service signals, subscriber control signals and digital multimedia information signals on, respectively, first, second and third signal channels;

each said subscriber premises including a subscriber interface for transmitting or receiving audio telephone service signals, subscriber control signals and digital multimedia information signals on, respectively, the first, second and third signal channels; and a plurality of subscriber local loops interconnecting corresponding subscriber and central office interfaces.

2. The network according to claim 1, wherein said multimedia information server means comprises a database.

3. The network according to claim 1, wherein said multimedia information server means comprises a plurality of data bases.

4. The network according to claim 3, wherein said plurality of data bases are distributed among plural sites.

5. The network according to claim 4, wherein said data bases are interconnected through said gateway.

6. The network according to claim 4, wherein said data bases are interconnected outside said gateway.

7. The network according to claim 1, including means for establishing a communication path between subscriber loops so as to enable multimedia information supplied by said provider to be shared by subscribers interactively.

8. The network according to claim 1, wherein said central office interface frequency multiplexes said first, second and third signal channels.

9. The network according to claim 8, wherein said first, second and third signal channels are multiplexed on a common transmission medium.

10. A public switched telephone network for providing information from a multimedia information server to any one of a plurality of subscriber premises, comprising:

a telephone company central office receiving multimedia information signals from a multimedia information server and subscriber orders from a prescribed subscriber, said central office including a gateway for providing routing data in response to subscriber orders and a switch for routing multimedia signals from said server to the prescribed subscriber in accordance with said routing data;

a central office interface including a first multiplexer/demultiplexer unit for audio telephone service signals, subscriber control signals and digital multimedia information signals on, respectively, first, second and third signal channels;

each said subscriber premises including a second multiplexer/demultiplexer unit for transmitting or receiving audio telephone service signals, subscriber control signals and digital multimedia information signals on, respectively, the first, second and third signal channels; and a plurality of subscriber local loops interconnecting a corresponding subscriber interface and said central office interface, wherein said subscriber interface supplies uncompressed digital multimedia information signals, received from said central office, to a digital work station.

11. A public switched telephone network for providing information from a multimedia information server to any one of a plurality of subscriber premises, comprising:

a telephone company central office receiving multimedia information signals from a multimedia information server and subscriber orders from a prescribed subscriber, said central office including a gateway for providing routing data in response to subscriber orders and a switch for routing multimedia signals from said server to the prescribed subscriber in accordance with said routing data, wherein said multimedia information signals incoming from the central office are supplied to a personal computer;

a central office interface including a first multiplexer/demultiplexer unit for audio telephone service signals, subscriber control signals and digital multimedia information signals on, respectively, first, second and third signal channels;

each said subscriber premises including a second multiplexer/demultiplexer unit for transmitting or receiving audio telephone service signals, subscriber control signals and digital multimedia information signals on, respectively, the first, second and third signal channels; and a plurality of subscriber local loops interconnecting a corresponding subscriber interface and said central office interface.

12. A public switched telephone network for providing information from a multimedia information server to any one of a plurality of subscriber premises, comprising:

a telephone company central office receiving multimedia information signals from a multimedia information server and subscriber orders from a prescribed subscriber, said central office including a gateway for providing routing data in response to subscriber orders and a switch for routing multimedia signals from said server to the prescribed subscriber in accordance with said routing data;

a central office interface including a first multiplexer/demultiplexer unit for audio telephone service signals, subscriber control signals and digital multimedia information signals on, respectively, first, second and third signal channels;

each said subscriber premises including a second multiplexer/demultiplexer unit for transmitting or receiving audio telephone service signals, subscriber control signals and digital multimedia information signals on, respectively, the first, second and third signal channels; and a plurality of subscriber local loops comprised of coaxial cable and interconnecting a corresponding subscriber interface and said central office interface.

13. A public switched telephone network for providing information from a multimedia information server to any one of a plurality of subscriber premises, comprising:

a telephone company central office receiving multimedia information signals from a multimedia information server and subscriber orders from a prescribed subscriber, said central office including a gateway for providing routing data in response to subscriber orders and a switch for routing multimedia signals from said server to the prescribed subscriber in accordance with said routing data;

a central office interface including a first multiplexer/demultiplexer unit for audio telephone service signals, subscriber control signals and digital multimedia information signals on, respectively, first, second and third signal channels;

each said subscriber premises including a second multiplexer/demultiplexer unit for transmitting or receiving audio telephone service signals, subscriber control signals and digital multimedia information signals on, respectively, the first, second and third signal channels; and a plurality of subscriber local loops comprised of optical fibers and interconnecting a corresponding subscriber interface and said central office interface.

14. A public switched telephone network for providing information from a multimedia information server to any one of a plurality of subscriber premises, comprising:

a telephone company central office receiving multimedia information signals from a multimedia information server and subscriber orders from a prescribed subscriber, said central office including a gateway for providing routing data in response to subscriber orders and a switch for routing multimedia signals from said server to the prescribed subscriber in accordance with said routing data;

a central office interface including a first multiplexer/demultiplexer unit for audio telephone service signals, subscriber control signals and digital multimedia information signals on, respectively, first, second and third signal channels;

each said subscriber premises including a second multiplexer/demultiplexer unit for transmitting or receiving audio telephone service signals, subscriber control signals and digital multimedia information signals on, respectively, the first, second and third signal channels; and a plurality of subscriber local loops interconnecting a corresponding subscriber interface and said central office interface, wherein said multimedia information server comprises a plurality of data bases interconnected outside said gateway.

15. A public switched telephone network for providing information from a multimedia information server to any one of a plurality of subscriber premises, comprising:

a telephone company central office receiving multimedia information signals from a multimedia information server and subscriber orders from a prescribed subscriber, said central office including a gateway for providing routing data in response to subscriber orders and a switch for routing multimedia signals from said server to the prescribed subscriber in accordance with said routing data;

a central office interface including a first multiplexer/demultiplexer unit for audio telephone service signals, subscriber control signals and digital multimedia information signals on, respectively, first, second and third signal channels;

each said subscriber premises including a second multiplexer/demultiplexer unit for transmitting or receiving audio telephone service signals, subscriber control signals and digital multimedia information signals on, respectively, the first, second and third signal channels; and a plurality of subscriber local loops interconnecting a corresponding subscriber interface and said central office interface, including means for establishing a communication path between subscriber loops so as to enable multimedia information supplied by said multimedia information server to be shared by subscribers interactively.

16. A central office based public switched telephone network for supplying digital multimedia information from a digital information storage medium to designated subscriber premises, comprising:

subscriber loop transmission means for transferring (1) selected digital multimedia information from a central office to said subscriber premises, (2) subscriber order data from said subscriber premises to said central office location, and (3) telephone service signals between said subscriber premises and said central office;

switch means at said central office for receiving said subscriber order data from said subscriber loop transmission means;

a gateway responsive to said subscriber order data from said switch means for producing routing data;

a multimedia information file server means responsive to requests received from said gateway for obtaining selected digital multimedia information from said digital information storage medium; and a digital cross-connect switch responsive to said routing data for transferring said digital multimedia information from said multimedia information file server means to said subscriber loop transmission means.

17. The network according to claim 16, wherein said subscriber loop transmission means includes means for frequency multiplexing (1)–(3).

18. The network according to claim 17, wherein the frequency multiplexing means multiplexes (1)–(3) on a common transmission medium.

19. The network of claim 16, wherein said multimedia information server means comprises:

subscriber request processing means responsive to subscriber request data for supplying information request data;

session control means responsive to said information request data for supplying information retrieval data and output control data;

data storage means responsive to said information retrieval data for supplying multimedia information; and output control means responsive to said output control data for supplying said multimedia information.

20. The network of claim 19, wherein said data storage means includes a plurality of storage media for storing said program data.

21. The network according to claim 20, wherein said data storage means includes optical storage means and magnetic storage means.

22. The network according to claim 21, wherein said data storage means includes different storage media having different respective information retrieval times.

23. The network according to claim 16, wherein said multimedia information server means comprises a data base.

24. The network according to claim 23, wherein said multimedia information server means comprises a plurality of data bases.

25. The network according to claim 24, wherein said plurality of data bases are distributed among plural sites.

26. The network according to claim 25, wherein said data bases are interconnected through said gateway.

27. The network according to claim 25, wherein said data bases are interconnected outside said gateway.

28. The network according to claim 16, including means for establishing a communication path between subscriber loops so as to enable multimedia information supplied by said multimedia information file server means to be shared by subscribers interactively.

* * * * *

UNITED STATES PATENT AND TRADEMARK OFFICE
CERTIFICATE OF CORRECTION

PATENT NO.  : 5,528,281

DATED       : Jun. 18, 1996

INVENTOR(S) : John Grady, et al

It is certified that error appears in the above-identified patent and that said Letters Patent is hereby corrected as shown below:

The title page, should be deleted to be replaced with the attached title page.
The drawing sheets, consisting of Figs. 1 and 2, should be deleted to be replaced with the drawing sheets, consisting of Figs. 1 and 2, as shown on the attached page.

Signed and Sealed this

Fifteenth Day of October, 1996

Attest:

BRUCE LEHMAN

Attesting Officer    Commissioner of Patents and Trademarks

United States Patent [19]

Grady et al.

[11] Patent Number: 5,528,281
[45] Date of Patent: Jun. 18, 1996

[54] METHOD AND SYSTEM FOR ACCESSING MULTIMEDIA DATA OVER PUBLIC SWITCHED TELEPHONE NETWORK

[75] Inventors: John Grady, Fairfax, Va.; Kenneth Hand, Silver Spring; John Modrowsky, Burtonsville, both of Md.; Arthur A. Richard, III, Springfield, Va.

[73] Assignee: Bell Atlantic Network Services, Arlington, Va.

[21] Appl. No.: 99,381

[22] Filed: Jul. 30, 1993

Related U.S. Application Data

[63] Continuation-in-part of Ser. No. 42,107, Apr. 1, 1993, abandoned, Ser. No. 766,535, Sep. 27, 1991, Pat. No. 5,247,347, and Ser. No. 42,270, Apr. 2, 1993, Pat. No. 5,410,343.

[51] Int. Cl.$^6$ .................................. H04N 7/14; H04M 11/00
[52] U.S. Cl. .................................. 348/7; 348/12; 348/14; 379/93; 379/96; 379/105; 455/4.2
[58] Field of Search .................................. 379/105, 102, 379/104, 94, 93, 96–98; 348/6–8, 10–13; 455/4.2; H04N 7/10, 7/12, 7/14

[56] References Cited

U.S. PATENT DOCUMENTS

| | | |
|---|---|---|
| 3,766,324 | 10/1973 | Budrys et al. |
| 4,332,980 | 6/1982 | Reynolds et al. |
| 4,381,522 | 4/1983 | Lambert |
| 4,506,387 | 3/1985 | Walter |
| 4,654,866 | 3/1987 | Bottle et al. |
| 4,755,872 | 7/1988 | Bestler et al. |
| 4,761,684 | 8/1988 | Clark et al. |
| 4,763,191 | 8/1988 | Gordon et al. |
| 4,792,849 | 12/1988 | McCalley et al. |

(List continued on next page.)

FOREIGN PATENT DOCUMENTS

| | | |
|---|---|---|
| 2193420 | 2/1988 | United Kingdom. |
| 2207838 | 2/1989 | United Kingdom. |
| WO92/12599 | 7/1992 | WIPO. |

OTHER PUBLICATIONS

"HDTV and Fiber Optic Communications–An Opinion"; Arpad G. Toth; pp. 1–11, Phillips Laboratories, North American Philips Corp., Briarcliff Manor, New York, EIA Digital ATV Workshop, Nov. 1989.

"Integrated Voice, Data, and Video In the Local Loop"; Neale C. Hightower; pp. 0915–0919, © 1986 IEEE, Globecom, 1986.

"Heathrow–Experience and Evolution"; John Bourne, Mark Balmes, Jim Justice; pp. 1091–1095, © 1990 IEEE, ICC 90.

(List continued on next page.)

*Primary Examiner*—Wing F. Chan
*Attorney, Agent, or Firm*—Lowe, Price, LeBlanc & Becker

[57] ABSTRACT

A public switched telephone network for providing information from a multimedia information server to any one of a plurality of subscriber premises, comprises a central office receiving multimedia information signals from a multimedia information server and orders from a prescribed subscriber. The central office includes a gateway system for conveying routing data in response to subscriber orders and a switch for routing multimedia signals from the server to the prescribed subscriber in accordance with the routing data. An interface at the central office transmits and receives audio telephone service signals, subscriber control signals and digital multimedia information signals on first, second and third signal channels. Each subscriber premises includes an interface for transmitting and receiving audio telephone service signals, subscriber control signals and digital multimedia information signals on the three signal channels. A plurality of subscriber local loops interconnect each subscriber interface and the central office interface. Multimedia information is collected from information providers and stored at media servers that provide a library of data and control sessions. Software modules at the media servers and resident terminals enable interactive multimedia session building, sharing of databases and joint authoring of multimedia presentations.

28 Claims, 8 Drawing Sheets

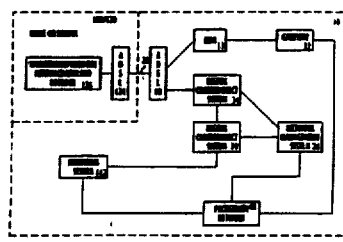

UNITED STATES PATENT AND TRADEMARK OFFICE
CERTIFICATE OF CORRECTION

PATENT NO. : 5,528,281

DATED : June 18, 1996

INVENTOR(S) : John Grady et al.

It is certified that error appears in the above-identified patent and that said Letters Patent is hereby corrected as shown below:

Delete drawing Fig. 4, and replace with the attached Fig. 4.

Signed and Sealed this

Thirty-first Day of December, 1996

Attest:

BRUCE LEHMAN

*Attesting Officer*     *Commissioner of Patents and Trademarks*